Nov. 24, 1942.       R. H. CUYLER ET AL       2,303,111
FLUID HEAD MEASURING DEVICE
Filed July 26, 1939        2 Sheets-Sheet 1

Inventors
ROBERT H. CUYLER
RICHARD L. GOETH

By Semmes, Keegin & Semmes Attorneys

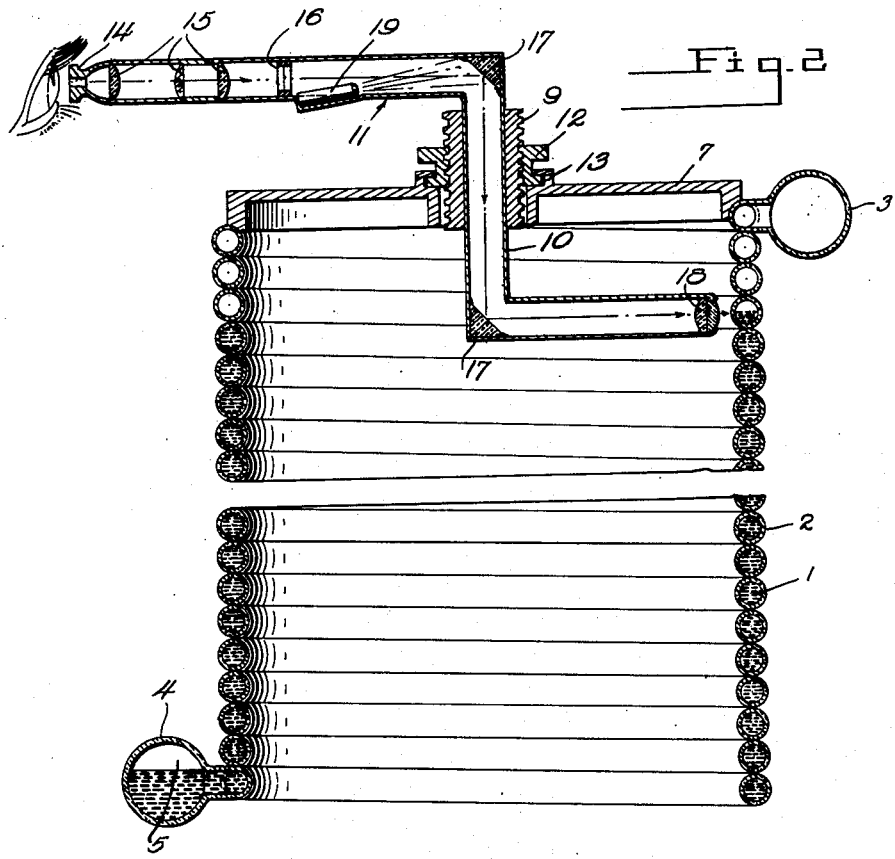
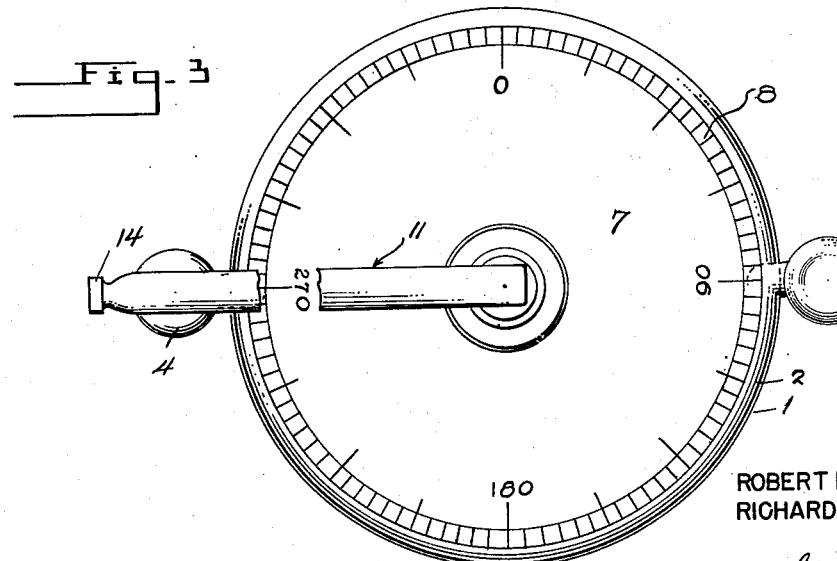

Patented Nov. 24, 1942

2,303,111

UNITED STATES PATENT OFFICE 2,303,111

FLUID HEAD MEASURING DEVICE

Robert H. Cuyler and Richard L. Goeth, San Antonio, Tex., assignors to John F. Camp, San Antonio, Tex.

Application July 26, 1939, Serial No. 286,657

12 Claims. (Cl. 265—1.4)

This invention relates to a measuring device, and more particularly has reference to a device for measuring the position of a fluid body. To facilitate comprehension of the inventive concept, a device for measuring variations in the force of gravity will be described, but it will be appreciated that the underlying principle of this device has other applications, and also that various modifications of the specific device here described are possible.

A device for measuring the force of gravity finds ready use in geological investigations in view of the fact that the force of gravity is a function of geological formations inter alia. For instance, salt domes have a decided effect on the force of gravity. Other geological formations likewise vary the force.

It is recognized that atmospheric pressure will support a column of a liquid in a vacuum, or partial vacuum. The exact height of the column so supported of course depends upon several variables, one of which is the force of gravity. The device here described is an application of this principle. More specifically, a column of a liquid, preferably mercury, is supported by a predetermined pressure applied to the base of the column, and a lesser pressure is provided above the column. With the pressures beneath and above the column maintained constant, and with proper corrections made for certain variables, the position of the body of liquid should indicate the force of gravity.

This invention is being described with particular reference to the adequate measuring of slight variations in the force of gravity, and to accomplish this a sloping column is contemplated, as distinguished from a truly vertical column. In this connection, it will be appreciated that the pressure at the base maintains a certain definite vertical height of the column, independent of the exact length of the column. For instance, at sea level and zero degrees C. (and with the normal pull of gravity) the atmospheric pressure will support a column of mercury 29.92 inches above its base. This might mean a truly vertical column 29.92 inches high, or an infinitely longer column, provided the top of such column is 29.92 inches above the horizontal plane of its base.

It will therefore be appreciated that when using a gradually sloping column, a slight variation in the force of gravity will register a pronounced change in the actual displacement of the column, although the vertical displacement of the column will be the same as if a truly vertical column were used. Obviously, a relatively straight sloping column is open to objection on the ground of cumbersomeness and, in practice, would be difficult to operate. In the present invention, however, this objection is obviated by employing a relatively long column of liquid, but providing such column in the form of a helix.

Therefore, one of the objects of this invention is to provide a device for measuring a body of fluid, and more precisely the position of a given body of fluid.

Another object of this invention is to provide a device for readily measuring slight variations of a force which is a factor in determining the position of a body of fluid.

A further object of this invention is to provide a device in which the position of a body of fluid is a function of the pull of gravity and in which slight variations in the pull of gravity will result in a relatively marked transposition of the body of liquid.

With these and other objects in view, which may be incident to my improvements, the invention consists in the applications of the principle hereinafter set forth and claimed, with the understanding that the said applications may be varied and that the specific embodiment described may be modified in construction, proportions and arrangements, without departing from the spirit and scope of the appended claims.

In the accompanying drawings, in which corresponding numerals refer to the same parts, there are disclosed several embodiments of a device which finds particular application in the measurement of the force of gravity, but which type of device is susceptible of other uses. In these drawings:

Figure 2 is a modified form of device.

Figure 3 is a top plan view of the device shown in Figure 2.

Figure 1:
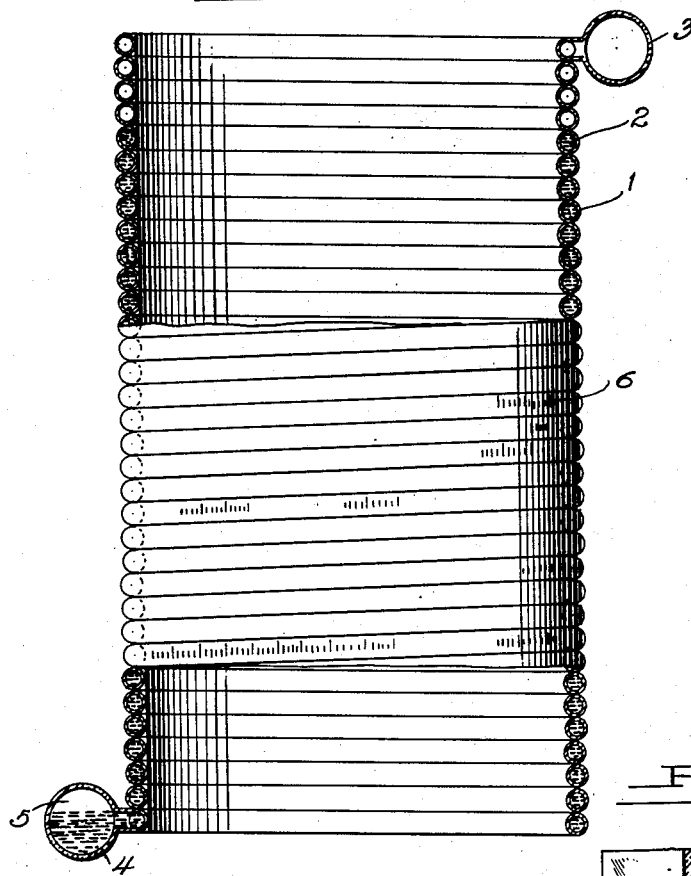
Figure 1 depicts one form of the device.

This invention consists essentially in a spiral channel which is shown in Figures 1 and 2 as formed from a piece of tubing 1. This tubing may be made of glass or of some other transparent material and is adapted to contain a column of a liquid 2 which is preferably a heavy liquid such as mercury. The exact size of the tubing and the diameter of the spiral will be governed by the degree of accuracy necessary and the amount of space available. In general, however, the tubing may be of one-quarter inch o. d. and the helix may be from one to two feet in diameter. Within these limits, a relatively compact instrument may be provided which at the same time will afford a high degree of accuracy.

The mercury is, in effect, balanced between a pressure applied to its base, and the pressure above it, plus the pull of gravity. It is therefore necessary to maintain the pressure in the channel above the mercury less than the pressure beneath it, and in practice the coil above the mercury is vacuumized. To afford a maximum vacuumized space, there is attached to the upper free end of the tubing a bulb 3 which is exhausted along with the tubing above the mercury. It will be of course appreciated that this bulb may be omitted if additional tubing is provided to afford a sufficient vacuum chamber.

Likewise at the base of the spiral, a bulb 4 is affixed to the free end of the tubing and an air pocket 5 is provided therein which is of sufficient pressure to support the column of mercury. For purposes of discussion, we may assume that there is a substantially true vacuum in the bulb 3 and the tubing above the body of mercury and that one atmosphere of pressure is maintained in the air pocket 5. Under such a condition, and at sea level, zero degrees C., and with the normal pull of gravity, the column of mercury 2 would reach a point 29.92 inches above the base of the column.

It will be apparent that any variation in the force of gravity will be registered by a change in the height of the mercury, and, even though the true vertical displacement of the mercury may not be great, there will be a substantial change axially of the tubing in view of the relatively slight pitch of the spiral tubing. This displacement of the mercury is actually so marked that relatively slight changes in the force of gravity will be apparent to the naked eye. In view of the relatively small bore of the tubing, it should be stated that the meniscus at the top of the mercury column will be in a plane that is substantially perpendicular to the axis of the tube, and therefore it is relatively easy to determine where the top of the column terminates in the tube. To facilitate the recording of such changes, the exterior of the tubing may be etched with calibrations 6, and in actual practice such calibrations may be confined to a relatively few convolutions in the vicinity of the top of the mercury, for a few convolutions will take care of all of the variations which will be encountered in actual practice.

Under most conditions, a device such as shown in Figure 1 suffices for all practical purposes, but if more precision in observing the recordings is desired, an optical device for magnifying the exact points at which the mercury terminates may be employed, such as shown in Figure 2. In this form of the device, a plate 7 fits upon the top of the helix to form a protractor provided with the usual calibrations 8.

The plate 7 is provided with a centrally disposed opening through which extends a worm gear 9 which is sweated or otherwise secured to a vertical section 10 of a periscope arrangement 11. The worm 9 is engaged by a worm nut 12 which is rotatably mounted on the plate 7 in a conventional manner, such as by the flange arrangement 13.

The periscope is provided with the conventional eye piece 14, lenses 15, cross wires 16, mirrors or prisms 17 and objective lens 18. If desired, and particularly if the spiral tubing is encased in a heat insulating covering, a light bulb 19 may be used to illuminate the meniscus.

It will be noted that the worm nut 12 may be rotated to raise and lower the periscope so that it may be sighted on the particular convolution where the mercury terminates, and the periscope may be rotated in azimuth to locate the meniscus of the mercury. In this connection, ball bearings may be provided for the worm nut 12 so that it will freely rotate with the worm gear 9. If desired, a pointer (not shown) may be secured to the periscope to register with the calibrations of the protractor. The reading on the protractor, when considered in conjunction with the particular convolution in which the meniscus is located, will indicate the gravitational pull.

It will be appreciated that in actual operation of the devices shown in Figures 1 and 2 it will be necessary to make corrections for the several variables involved, principally the temperature, but such corrections can be readily made from the proper correction tables. In lieu of correcting the readings indicated by the instruments of Figures 1 and 2, the other variables may be compensated for by means of the device shown in Figure 4. This device is adapted to locate the meniscus at any desired point on the spiral as a base point so that thereafter any plus or minus readings may be taken from that point.

More specifically, a U-tube 22 is tapped into bulb 4, the U being partially filled with mercury or other suitable liquid 23. At its opposite end, the U-tube is tapped into a cylinder 24 which is provided with a piston 25. A suitable gland 26 is provided which may be screw-threaded to register with threads on the stem 27 of the piston 25. The piston 25 may therefore be extended or retracted in the cylinder by rotating the stem 27, and for this purpose a knurled head 28 may be provided on the stem. Preferably, a body of oil, glycerin, or other suitable liquid 29 is provided in the cylinder, and it will be appreciated that axial movement of the piston 25 will vary the pressure in the air pocket 5. The pump arrangement shown in Figure 4 may of course be used with either one of the devices shown in Figures 1 and 2.

Figure 4:
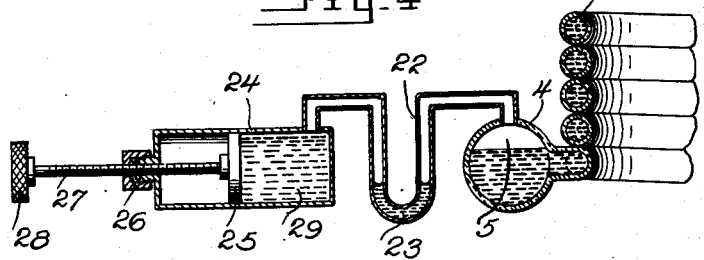
Figure 4 is a sectional view of a piece of auxiliary equipment which may be used to control the pressure applied to the base of the liquid column.

While it is preferable to use the device shown in Figure 4 to vary the pressure in the base of the mercury column, it will be appreciated that under some circumstances (particularly where the bulb 3 is maintained under some pressure instead of vacuumized) the pressure above the mercury may be varied to set the meniscus at the base point desired.

Figure 5:
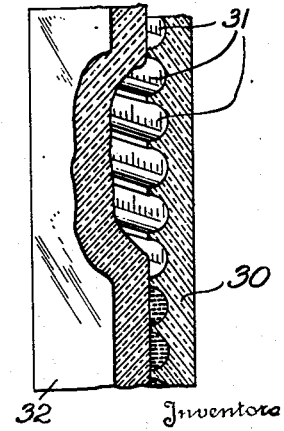
Figure 5 is a view, broken away, of one alternative form of channel for the liquid column.

While the channel for the mercury column has heretofore been described as helical tubing, and such tubing will be eminently satisfactory, in manufacture the mercury channel may be formed as shown in Figure 5. In such case, a cylinder 30 may be machined to form a helical groove 31 on its exterior, and then a second cylinder 32 fitted snugly over the exterior of the cylinder 30 to cover such grooves and thereby form a channel. Obviously, the grooves may be machined on the interior of the cylinder 32 instead of cylinder 30, or, if desired, grooves may be provided in both cylinders and then the cylinders so assembled that the respective grooves will register.

It will be appreciated that this invention provides a relatively inexpensive apparatus which will record with a high degree of accuracy any change in the factors which govern the position of a fluid body. As stated at the outset, while it finds particular application in a device for measuring the force of gravity, the invention is by no means restricted to this specific embodiment and various applications of the principle and modifications of the apparatus may be made without exceeding the scope of the inventive concept.

We claim:

1. A device for measuring the force of gravity comprising a helical tube having a substantially vertical axis sealed from the atmosphere, calibrations carried by said tube, a bulb formed on the upper end of the tube and in communication therewith, another bulb formed on the lower extremity of the tube and in communication therewith, a column of mercury having its upper surface movable in said tube, a predetermined pressure existing in the tube and bulb over the mercury, and a pressure in the lower bulb in excess of that above the mercury.

2. In a device for measuring the head of a column of liquid, a container for the liquid sealed from the atmosphere, the upper portion of which is of elongated tubular form slightly inclined relative to the horizontal, whereby a slight variation in the head of the liquid will cause the upper surface of the liquid to be considerably displaced axially through said elongated tube, means to exert a predetermined pressure upon the top of the liquid column and additional means to exert a pressure on the base of the liquid column in excess of the first-mentioned pressure.

3. In a device for measuring the head of a column of liquid, a container for the liquid sealed from the atmosphere, the upper portion of which is of elongated tubular form arranged in the form of a helix having its axis vertical, whereby a slight variation in the head of the liquid will cause the upper surface of the liquid to be considerably displaced axially through said elongated tube.

4. In a device for measuring the head of a column of liquid, a container for the liquid sealed from the atmosphere, the upper portion of which is of elongated tubular form arranged in the form of a helix having its axis vertical, whereby a slight variation in the head of the liquid will cause the upper surface of the liquid to be considerably displaced axially through said elongated tube, and an optical instrument mounted for rotation about the axis of said helix for observing the position of the surface of said liquid.

5. In a device for measuring the head of a column of liquid, a container for the liquid sealed from the atmosphere, the upper portion of which is of elongated tubular form arranged in the form of a helix having its axis vertical, whereby a slight variation in the head of the liquid will cause the upper surface of the liquid to be considerably displaced axially through said elongated tube, an optical instrument mounted for rotation about the axis of said helix for observing the position of the surface of said liquid, and means for displacing said optical instrument axially of said helix to enable various convolutions of the helix to be observed.

6. In a device for measuring the head of a column of liquid, a container for the liquid sealed from the atmosphere, the upper portion of which is of elongated tubular form arranged in the form of a helix having its axis vertical, whereby a slight variation in the head of the liquid will cause the upper surface of the liquid to be considerably displaced axially through said elongated tube, means at the lower end of the helix to provide for the displacement of the liquid, an optical instrument mounted for rotation about the axis of said helix for observing the position of the surface of said liquid, means for displacing said optical instrument axially of said helix to enable various convolutions of the helix to be observed, and indicating means associated with said optical instrument for indicating the head of said liquid.

7. In a device for measuring the head of a column of liquid, a container for the liquid sealed from the atmosphere, the upper portion of which is of elongated tubular form arranged in the form of a helix having its axis vertical, whereby a slight variation in the head of the liquid will cause the upper surface of the liquid to be considerably displaced axially through said elongated tube, means at the lower end of the helix to provide for the displacement of the liquid and an observation tube rotatably mounted axially within the upper portion of said helix and having an observation opening in the lower portion thereof for observing the surface of the liquid in the helical tube.

8. In a device for measuring the head of a column of liquid, a container for the liquid sealed from the atmosphere, the upper portion of which is of elongated tubular form arranged in the form of a helix having its axis vertical, whereby a slight variation in the head of the liquid will cause the upper surface of the liquid to be considerably displaced axially through said elongated tube, means at the lower end of the helix to provide for the displacement of the liquid, an observation tube rotatably mounted axially within the upper portion of said helix and having an observation opening in the lower portion thereof for observing the surface of the liquid in the helical tube, means in the lower portion of the observation tube for reflecting an image received through said opening axially up through the observation tube, and means carried by the upper portion of said observation tube for observing said image.

9. In a device for measuring the head of a column of liquid, a container for the liquid sealed from the atmosphere, the upper portion of which is of elongated tubular form arranged in the form of a helix having its axis vertical, whereby a slight variation in the head of the liquid will cause the upper surface of the liquid to be considerably displaced axially through said elongated tube, means at the lower end of the helix to provide for the displacement of the liquid, a support on the upper portion of the helix, an observation tube rotatably mounted in said support and axially of the helix and having an observation opening in the lower portion thereof for observing the surface of the liquid in the helical tube, means carried by said support for displacing said observation tube axially of the helix, means carried by the lower end of the observation tube for reflecting the image of the position of the upper surface of the liquid upwardly through said observation tube, and means carried by the upper end of said observation tube for observing the reflected image.

10. In an apparatus for measuring the force of gravity, a helical channel sealed from the atmosphere, a liquid column having its upper surface movable in the sealed channel, means to exert a predetermined pressure upon the top of the liquid column, and additional means to exert a pressure on the base of the column in excess of the first mentioned pressure.

11. In an apparatus for measuring the force of gravity, a helical tube having a substantially vertical axis sealed from the atmosphere, a column of mercury having its upper surface movable in said tube, means to exert a predetermined pressure on the upper surface of the mercury column, additional means to subject the base of the mercury to a pressure in excess of the first mentioned pressure, means to vary the pressure on the base of the mercury, and microscopic means to observe the displacement of the upper surface of the mercury column in the helical tube.

12. In a device for measuring the force of gravity, an interior cylindrical portion, a second cylindrical portion closely fitted over the interior cylindrical portion, there being a helical groove in the surface of one of said portions forming a channel in conjunction with the opposite portion, the helical groove being sealed from the atmosphere, a column of mercury having its upper surface movable in the channel means to exert a predetermined pressure upon the top of the mercury column, further means to exert a pressure on the base of the mercury column in excess of the first-mentioned pressure, and means to determine the head of mercury in said channel.

RICHARD LOUIS GOETH.
ROBERT H. CUYLER.